(12) United States Patent
Madsen et al.

(10) Patent No.: US 9,075,922 B2
(45) Date of Patent: Jul. 7, 2015

(54) APPARATUS AND METHOD FOR DECODING DATA TRANSMISSIONS

(75) Inventors: Jens-Ole Madsen, Frederiksberg C (DK); Rune Lindholm, Sottunga (FI)

(73) Assignee: Nokia Corporation, Espoo (FI)

( * ) Notice: Subject to any disclaimer, the term of this patent is extended or adjusted under 35 U.S.C. 154(b) by 505 days.

(21) Appl. No.: 11/848,173

(22) Filed: Aug. 30, 2007

(65) Prior Publication Data

US 2008/0075102 A1    Mar. 27, 2008

Related U.S. Application Data

(60) Provisional application No. 60/842,218, filed on Sep. 5, 2006.

(51) Int. Cl.
*G06F 13/14* (2006.01)
*G06F 13/38* (2006.01)
*G06F 13/42* (2006.01)

(52) U.S. Cl.
CPC ............ *G06F 13/38* (2013.01); *G06F 13/4291* (2013.01); *G06F 2213/0042* (2013.01)

(58) Field of Classification Search
USPC .......................................................... 710/305
See application file for complete search history.

(56) References Cited

U.S. PATENT DOCUMENTS

| | | | | |
|---|---|---|---|---|
| 4,760,575 A * | 7/1988 | Watanabe | ...................... | 714/719 |
| 4,816,656 A * | 3/1989 | Nakano et al. | ................. | 235/380 |
| 5,850,524 A * | 12/1998 | Lamla et al. | ................... | 709/231 |
| 5,887,145 A | 3/1999 | Harari et al. | | |
| 6,102,743 A * | 8/2000 | Haffenden et al. | ............ | 439/630 |
| 6,168,077 B1 * | 1/2001 | Gray et al. | ..................... | 235/375 |
| 6,343,364 B1 * | 1/2002 | Leydier et al. | ................ | 713/500 |
| 6,439,464 B1 * | 8/2002 | Fruhauf et al. | ................. | 235/492 |
| 6,612,498 B1 * | 9/2003 | Lipponen et al. | ............. | 235/486 |
| 6,669,487 B1 * | 12/2003 | Nishizawa et al. | ............. | 439/60 |
| 6,697,372 B1 * | 2/2004 | McAlear | ........................ | 370/402 |
| 6,715,678 B1 * | 4/2004 | Sion et al. | ..................... | 235/441 |
| 6,752,321 B1 * | 6/2004 | Leaming | ........................ | 235/492 |
| 6,810,484 B2 * | 10/2004 | Govindaraman | ............. | 713/400 |
| 6,840,454 B1 | 1/2005 | Rhelimi | | |
| 6,904,489 B2 * | 6/2005 | Zarns | ............................. | 710/315 |
| 6,913,196 B2 * | 7/2005 | Morrow et al. | ................ | 235/451 |
| 7,031,704 B2 * | 4/2006 | Di Claudio et al. | ......... | 455/432.1 |
| 7,130,401 B2 * | 10/2006 | Rampey et al. | ........... | 379/142.14 |
| 7,140,549 B2 * | 11/2006 | de Jong | .......................... | 235/492 |
| 7,350,717 B2 * | 4/2008 | Conner et al. | ................. | 235/492 |

(Continued)

FOREIGN PATENT DOCUMENTS

| | | | | |
|---|---|---|---|---|
| EP | 555992 A1 * | 8/1993 | ............... | H04B 1/38 |
| EP | 1001329 | 5/2000 | | |

(Continued)

OTHER PUBLICATIONS

ISO/IEC 7816-3 Second edition Dec. 15, 1997.*

(Continued)

*Primary Examiner* — Paul R Myers
(74) *Attorney, Agent, or Firm* — Banner & Witcoff, Ltd.

(57) ABSTRACT

An interface comprising a single data connection, arranged to transfer data between the user equipment and an identity module. The data transferred over the interface may be arranged to be synchronized by at least one clock signal. The data transferred over the interface may comprise universal serial bus protocol data.

34 Claims, 6 Drawing Sheets

(56) References Cited

U.S. PATENT DOCUMENTS

| | | | |
|---|---|---|---|
| 7,369,982 B2* | 5/2008 | Leaming | 703/25 |
| 7,374,088 B2* | 5/2008 | Perben et al. | 235/441 |
| 7,395,435 B2* | 7/2008 | Benhammou et al. | 713/185 |
| 7,762,470 B2* | 7/2010 | Finn et al. | 235/492 |
| 7,831,249 B2* | 11/2010 | Lohlein et al. | 455/423 |
| 8,422,990 B2* | 4/2013 | Heutschi et al. | 455/406 |
| 8,532,138 B2* | 9/2013 | Li | 370/466 |
| 2001/0025882 A1 | 10/2001 | Coulier | |
| 2002/0047045 A1* | 4/2002 | Song et al. | 235/441 |
| 2002/0065966 A1 | 5/2002 | Brief | |
| 2002/0134837 A1* | 9/2002 | Kishon | 235/449 |
| 2003/0137990 A1 | 7/2003 | Rush et al. | |
| 2003/0212848 A1 | 11/2003 | Liu et al. | |
| 2005/0021891 A1 | 1/2005 | Hsieh et al. | |
| 2005/0091501 A1* | 4/2005 | Osthoff et al. | 713/181 |
| 2005/0095020 A1* | 5/2005 | Eom et al. | 399/24 |
| 2005/0208967 A1* | 9/2005 | Buniatyan | 455/557 |
| 2005/0251593 A1 | 11/2005 | Lin et al. | |
| 2005/0259673 A1* | 11/2005 | Lu et al. | 370/419 |
| 2006/0253636 A1* | 11/2006 | Jones et al. | 710/301 |
| 2007/0083273 A1* | 4/2007 | Ruggero | 700/1 |
| 2008/0052439 A1* | 2/2008 | Young et al. | 710/305 |

FOREIGN PATENT DOCUMENTS

| | | | | |
|---|---|---|---|---|
| JP | 2003005588 A | * | 1/2003 | G03G 21/00 |
| WO | WO-02/06935 | | 1/2002 | |

OTHER PUBLICATIONS

SecureIDNews Nov. 2, 2004 "Omnikeyreleases new portable SIM card readerwith enhanced Reader-to-Card data transmission rates".*
Definition of Interface. Microsoft press Computer Dictionary Third Edition 1997.*
USB-Implementers Forum Inc: "Universal Serial Bus Specification—Revision2.0" Unverisal Serial Bus Specification Revision 2.0—Apr. 27, 2000.
International Search Report for PCT Application No. PCT/IB2007/002023 dated Apr. 1, 2009.

* cited by examiner

APPARATUS AND METHOD FOR DECODING DATA TRANSMISSIONS

CROSS-REFERENCE TO RELATED PATENT APPLICATIONS

The present application claims priority to U.S. Provisional Patent Application No. 60/842,218, filed Sep. 5, 2006.

FIELD OF THE INVENTION

The invention relates to an interface, and in particular but not exclusively for an interface between an universal integrated circuit card (UICC) and an user equipment hosting the universal integrated circuit card.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A communication system can be seen as a facility that enables communication sessions between two or more entities such as user equipment and/or other nodes associated with the communication system. The communication may comprise, for example, communication of voice, data, multimedia and so on. A session may, for example, be a telephone call between users or multi-way conference session, or a communication session between user equipment and an application server (AS), for example a service provider server. The establishment of these sessions generally enables a user to be provided with various services.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

One of the "rules" of the communication system is the requirement to identify and to authenticate the user of the user equipment when in communication with the wireless communications system. In many user equipment a user identification module (UID) is used to provide the mobile phone with relevant information to transmit to the communications system to carry out this action. In typical universal mobile telecommunications systems (UMTS) the function of the user identity module is carried out by the insertion of a removable universal integrated circuit card (UICC). The UICC is commonly also known as a chip card and typically consists of a CPU, read-only memory, random-access memory, and also some electronically erasable programmable read-only memory (EEPROM). Typically, the memory allows the storage of a few hundred kilobytes of data. Furthermore, the smart card has various input/output circuitry to enable it to talk to the outside world.

The UICC used in the known UMTS mobile telephone networks contains an application such as the universal subscriber identity module (USIM) which stores user subscriber information, authentication information and provides storage base for text messages. For example, for authentication purposes, the USIM stores a long term pre-shared secret key K which is shared with an authentication centre (KuC) in the network. The USIM also verifies a sequence number which must be within a range using a window mechanism to avoid replay attacks.

Similarly, the Global Standard for Mobile (GSM) mobile telephone networks use an UICC also known as a subscriber identity module (SIM) which securely stores the key identifying the mobile phone service subscriber as well as subscription information, preferences and text messages.

The UICC/SIM card is required to interface with the user equipment. Conventional interfaces between the UICC/SIM card and the user equipment have a fixed upper bandwidth—the existing interfaces cannot transfer data faster than approximately 600 Kbits per second. This upper bandwidth can lead to delays in extracting data such as cryptographic keys from the UICC or for reading or writing of real time data to the limited capacity memory on the UICC.

Faster interface designs have been proposed which can transfer data at up to 8 Mbits per second.

The universal serial bus (USB) interface proposal is based upon the physical and logical interface procedure commonly used within the personal computing world for connecting components together. The USB proposal although being flexible and capable of providing speed of 12 Mbits per second, is inherently complex and requires a physical interface implementation of a pair of twisted cables to communicate data. This added complexity adds cost and weight in physical terms and also requires the implementation of lower efficiency methods of transferring data over current slow interfaces.

The multimedia card (MMC) interface proposal is another based on a technology used in a complementary field—this technology currently used to transfer data to and from multimedia memory cards. The secureMMC 2.0 interface layer specification is publicly available from the European Telecommunications Standards Institute (ETSI) website. This interface proposal though is also flawed in that implementations of the interface is not well developed, especially compared with the USB interface.

The synchronous T=1 interface proposal is based on a combination of the ETSI standard TS 102 221 v7.5: Smart Cards: UICC-Terminal interface; Physical and logical characteristics, which builds upon the asynchronous T=1 interface proposed in ISO/IEC 7816-3: Identification cards—Integrated Circuit Cards—Part 3: Cards with contacts: Electrical interface and transmission protocols. This interface is also relatively new and undeveloped, especially compared with the USB interface.

Embodiments of the present invention aim to address these problems associated with the proposed interfaces.

SUMMARY OF THE INVENTION

Various aspects of the present invention can be seen from the appended claims.

There is provided according to the invention an interface comprising a single data connection, arranged to transfer data between the user equipment and an identity module, the data transferred over the interface is arranged to be synchronised by at least one clock signal, wherein the data transferred over the interface comprises universal serial bus protocol data.

The data transferred over the interface may further comprise an identification part identifying the data as universal serial bus protocol data. The data transferred may further comprise T=1 protocol data. The data transferred may further comprise a further identifier identifying the T=1 protocol data is T=1 protocol data. The identity module is preferably at least one of: an universal integrated circuit card, and a subscriber identity module (SIM). The interface may comprise a pull up resistor. The interface may further comprise a second connection arranged to communicate the at least one clock signal from the user equipment to the identity module.

According to a second aspect of the present invention there is provided an interface for a user equipment, wherein the interface is arranged to permit packet data to be transmitted by a transmitter and received by a receiver; wherein the transmitter is arranged to transmit at least one data block comprising an identification part, and the receiver on receipt of the identification part, is arranged to identify the packet protocol determined by the identification part value, and is arranged to configure itself to receive the block using the identified protocol.

The identification part may comprise a protocol identification byte. The identification byte may comprise a protocol identifier value stored in a first four bits of the identification byte and a complement of the protocol identifier value stored in the second four bits of the identification byte. The identification byte may comprise a protocol identifier value stored in a four most significant bits of the identification byte and a complement of the protocol identifier value stored in the four least significant bits of the identification byte. The block is preferably a USB block, wherein the block may further comprise at least one USB packet and at least one end-of-frame marker. The USB packet is preferably at least one of: a Packet identifier (PID) packet; a Address (ADDR) packet; an end point (ENDP) packet; a Frame number packet; a USB data packet; and a cyclic redundancy check (CRC) packet. The block is preferably a T=1 protocol block, wherein the T=1 protocol block preferably comprises an information field. The transmitter is preferably arranged to transmit a further block, wherein the further block comprises a second identifier identifying the block as an End-of-Frame block.

According to a third aspect of the present invention there is provided an user equipment comprising an interface for communicating with an identity module, wherein the interface is arranged to permit packet data to be transmitted by a transmitter and received by a receiver; wherein the transmitter is arranged to transmit at least one data block comprising an identification part, and the receiver on receipt of the identification part, is arranged to identify the packet protocol determined by the identification part value, and is arranged to configure itself to receive the block using the identified protocol.

The identification part may comprise a protocol identification byte. The identification byte may comprise a protocol identifier value stored in a first four bits of the identification byte and a complement of the protocol identifier value stored in the second four bits of the identification byte. The identification byte may comprise a protocol identifier value stored in a four most significant bits of the identification byte and a complement of the protocol identifier value stored in the four least significant bits of the identification byte. The block is preferably a USB block, wherein the block may further comprise at least one USB packet and at least one end-of-frame marker. The USB packet is preferably at least one of: a Packet identifier (PID) packet; a Address (ADDR) packet; an end point (ENDP) packet; a Frame number packet; a USB data packet; and a cyclic redundancy check (CRC) packet. The block is preferably a T=1 protocol block, wherein the T=1 protocol block preferably comprises an information field.

According to a fourth aspect of the present invention there is provided an identity module arranged to communicate with a user equipment via an interface, wherein the interface is arranged to permit packet data to be transmitted by a transmitter and received by a receiver; wherein the transmitter is arranged to transmit at least one data block comprising an identification part, and the receiver on receipt of the identification part, is arranged to identify the packet protocol determined by the identification part value, and is arranged to configure itself to receive the block using the identified protocol.

The identification part may comprise a protocol identification byte. The identification byte may comprise a protocol identifier value stored in a first four bits of the identification byte and a complement of the protocol identifier value stored in the second four bits of the identification byte. The identification byte may comprise a protocol identifier value stored in a four most significant bits of the identification byte and a complement of the protocol identifier value stored in the four least significant bits of the identification byte. The block is preferably a USB block, wherein the block may further comprise at least one USB packet and at least one end-of-frame marker. The USB packet is preferably at least one of: a Packet identifier (PID) packet; a Address (ADDR) packet; an end point (ENDP) packet; a Frame number packet; a USB data packet; and a cyclic redundancy check (CRC) packet.

The block is preferably a T=1 protocol block, wherein the T=1 protocol block preferably comprises an information field.

According to a fifth aspect of the present invention there is provided a method for transferring data between an user equipment and an identity module via an interface comprising a single data connection, the method comprising: synchronising the data transferred over the interface by at least one clock signal, transmitting universal serial bus protocol data. Transmitting universal serial bus protocol data may comprise; further transmitting an indicator part data identifying the universal serial bus protocol data.

The method as described above may further comprise transmitting an end of frame part after a predetermined size of universal serial bus protocol data has been transmitted. The predetermined size is preferably 1500 bytes.

The method as described above may further comprise the step of filtering the universal serial bus protocol data to remove SYNC packets prior to transmission. The method as described above may further comprise filtering the universal serial bus protocol data to remove the bit-stuffed logical zero signal values prior to transmission. The method as described above may further comprise further transmitting T=1 protocol data. The method as described above may further comprise further transmitting a further identification part identifying the T=1 protocol data.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Embodiments of the present invention relate particularly but not exclusively to user equipment. Embodiments of the invention may be applicable to other mobile devices where user identification is carried out by use of a user identifier locate card.

Figure 1:
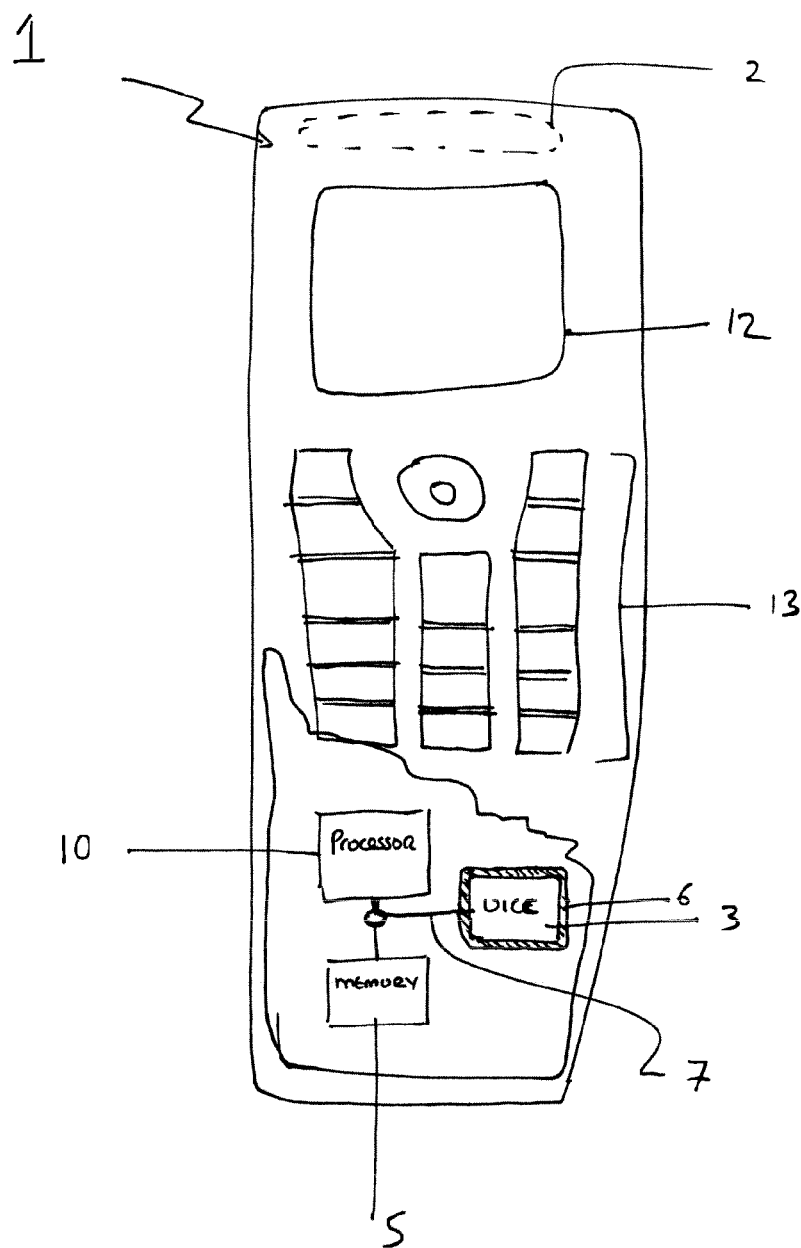
FIG. 1 shows a user equipment within which the invention may be embodied.

With reference to FIG. 1 there is shown user equipment 1 in a form of a mobile communication device which in operation may communicate with a radio access network (RAN) in order to connect to a wireless communications system such as described previously. The example user equipment 1 has an internal antenna element 2 for wirelessly receiving and transmitting signals from and to base stations of a mobile communications network. The mobile user equipment 1 is also provided with a display 12 for displaying images and other information to the user of the user equipment 10. The operation of the user equipment 10 may be controlled by means of a keypad 13. Furthermore, the user equipment 10 is provided with a processor entity 10, memory 5, and a slot 6 for inserting a UICC 3. Although it is known by the person skilled in the art that user equipment may comprise further components those components not associated with the invention have not been described in order to simplify the description. The user equipment in other embodiments of the invention may be a communications device or any electronic equipment with communications capability, for example a PDA, laptop, or PC.

In FIG. 1 the UICC 3 is shown inserted into the slot 6. In some embodiments the UICC 3 may be permanently fixed within the user equipment 1. The UICC communicates with the processor and memory via the interface 7. The interface 7 physically is a serial interface which enables data to be transferred to and from the user equipment 1 components such as the processor 10 and/or the memory 5.

In other embodiments of the invention the slot may incorporate any identity module device. For example the slot may incorporate a subscriber identity module (SIM) card. Or in other embodiments the slot may incorporate a removable user identity module (R-UIM) or Willcom subscriber identity module (W-SIM).

Figure 2:
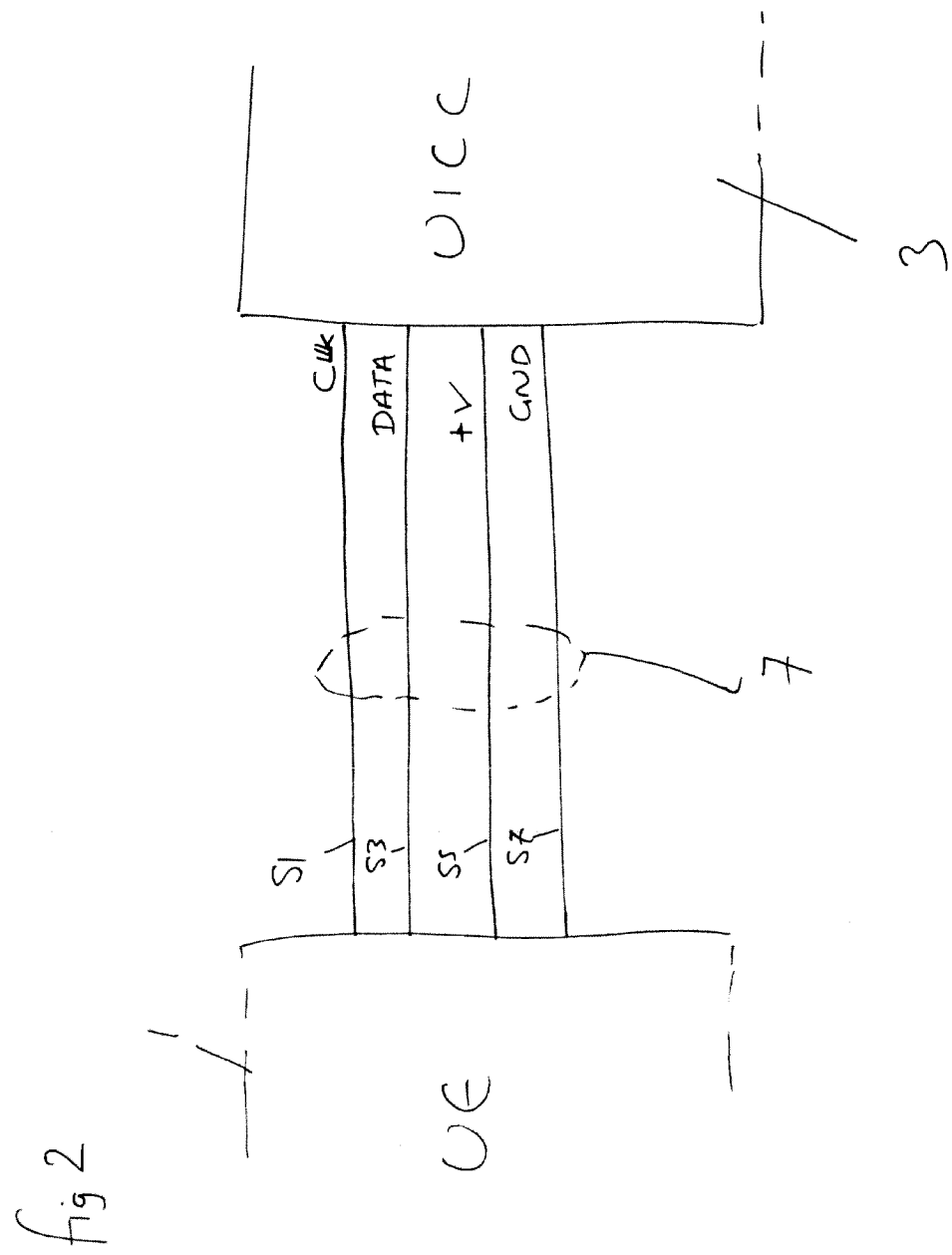
FIG. 2 shows a schematic view of the physical arrangement of the interface as shown in FIG. 1.

With reference to FIG. 2, a physical representation of the interface 7 between the user equipment 1 and the UICC is shown in further detail. The physical interface 7 between the UICC 3 and the user equipment 1 comprises a clock line 51, on which a clock signal is transmitted by the user equipment 1 to the UICC 3 in order to synchronise communication between the UE 1 and UICC. Furthermore the interface comprises a data line 53, on which data is transmitted from the UICC 3 to the UE 1 and from the UE 1 to the UICC 3. The interface also comprises two power lines the positive voltage power rail +v 55 and negative 57 voltage power rail or ground or earth rail GND 57. The positive 55 and negative 57 voltage rails provide power to the UICC 3. In some embodiments of the invention the positive and negative power rails are not provided as part of the physical interface 7 and are provided as a separate power interface.

In some embodiments of the invention the clock line or clock connection is optional with the UE 1 and the UICC 3 synchronising the data transmitted between the two by using clock signals generated by each of the UE 1 and UICC 3. These internal clocks may be themselves adjustable and arranged in such a way that they initially communicate over the data line 53 and synchronise the two clock signals before synchronising data.

The physical interface 7 transmits and receives data based on a half duplex synchronous serial bit procedure. In other words, data is transmitted a bit at a time on the interface and although transmission is possible in both directions, only transmission in a single direction is possible at any one instant.

Figure 3:
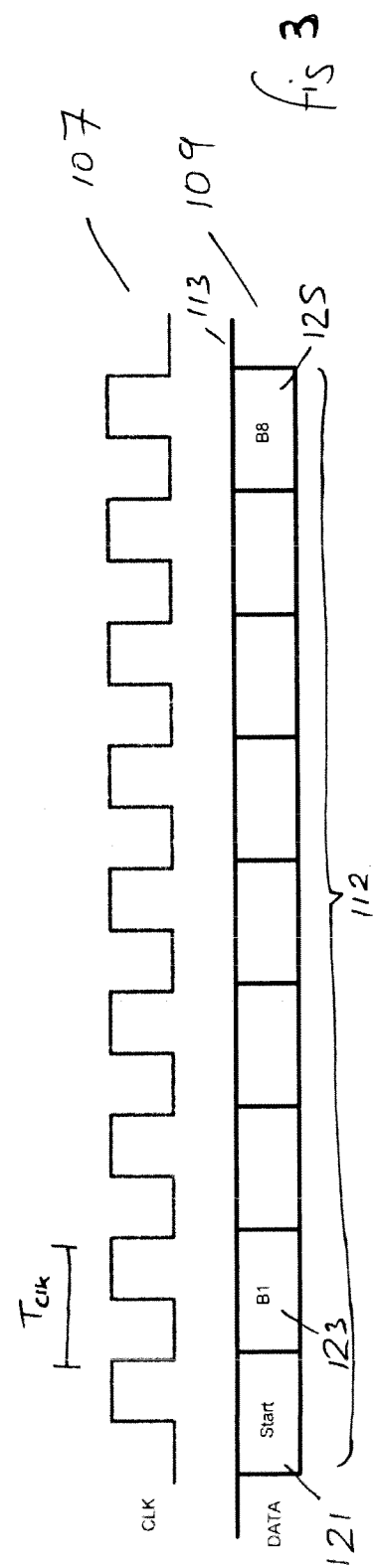
FIG. 3 shows a schematic view of a data structure which may be transmitted on the physical interface in embodiments of the invention as shown in FIG. 2.
Figure 4:
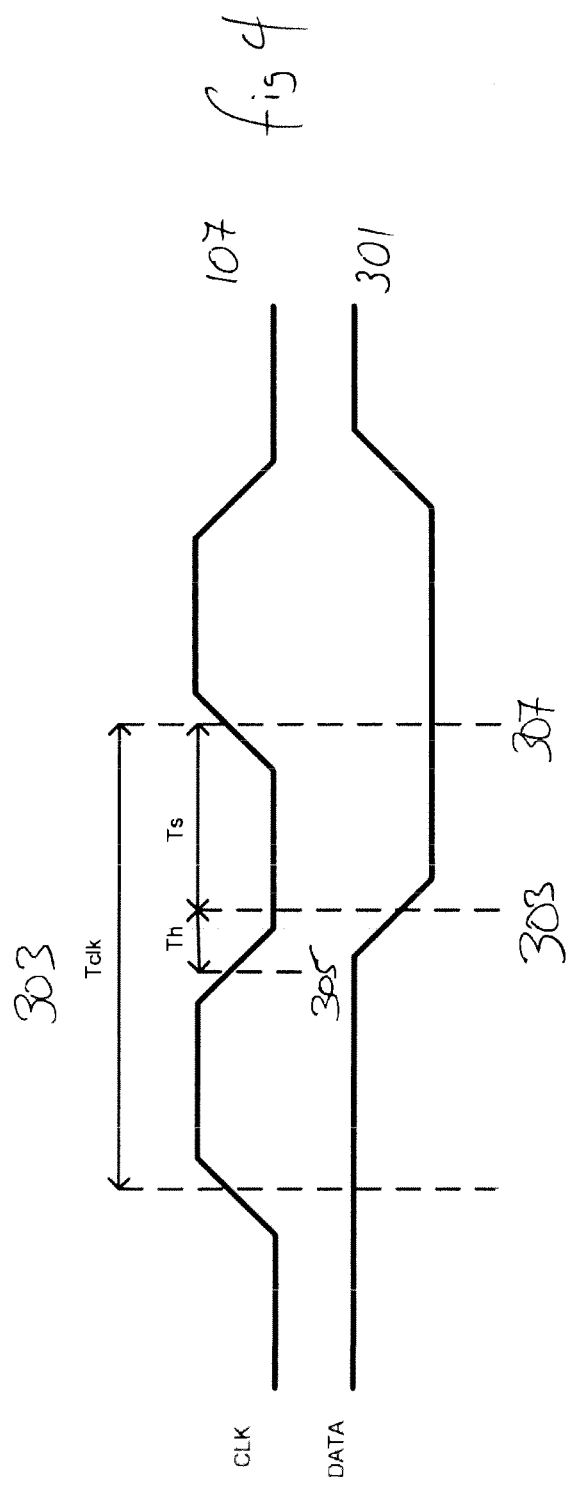
FIG. 4 shows a schematic view of the interface timing references used for signaling bits within the data structure as shown in FIG. 3.

With respect to FIGS. 3 and 4, the physical transmission of data on the data line 53 is shown in more detail. Data is transmitted on the data line 53 as is shown schematically with regards to FIG. 3 as a series of bits. These bits are arranged in groups of 9 bits which define a character. FIG. 3 shows a clock signal 107 with a clock period Tclk which would be transmitted from the UE1 to the UICC over the clock line 51. The figure also shows a data signal 109 which would be transmitted over the data line 53 at the same time. The data signal shows a character 112 which comprises a start bit 121 and eight data bits, the first data bit shown as B1 123 and last data bit B8 125.

A high level signal on the interface data line represents a logical (1) and a low level signal on the interface data line 51a logical (0). The start bit 121 is presented as a logical 0 on the interface data line. The data bits are transmitted on the interface data line 51 in a character from the least significant bit to the most significant bit, and thus B8 125 represents the most significant bit and B1 the least significant bit.

In further embodiments of the present invention, the order of transmitting bits is reversed and the most significant bit is sent first. In other embodiments of the present invention, a low level signal on the interface data line 51 represents a logical 1 and a high level signal on the interface data line a logical 1. In further embodiments of the present invention, the start bit is represented as a logical 1 on the interface.

With reference to FIG. 4, an embodiment of the physical interface clock and data line timing is shown. In this figure the clock signal transmitted on the clock line is shown 107, furthermore an example of the signal transmitted on the data line 53 is also shown. In the embodiment shown in FIG. 4, the transmitter may change the signal state on the data line 51 at the same time or after the falling edge 305 of the clock signal on the clock line 53 and the receiver captures the signal on the data line 51 at the same time as the rising edge 307 of the clock signal on the clock line 53.

FIG. 4 shows the delay time between the falling edge 305 of the clock signal and the changing of output 303 transmitted data as time period Th and the time period Ts represents the time between the outputting of the data on the interface 303 and the rising edge 307 of the clock signal on the clock line 53 (i.e. the maximum propagation time for the signal to pass from the transmitter to the receiver if the receiver is to capture the data without an error occurring).

Characters are arranged into blocks. All characters contained in a single transmission block are sent consecutively so that the start bit of new character immediately follows the most significant bit of the previous character.

To assist detecting when a block has ended the data line 53 is terminated at the UE 1 with a pull up resistor (not shown), the resistor value may be large as the transmitter will drive the data actively low and high during transmission. At the end of any block transmission the pull up resistor will act to pull up the signal on the data line 51, as shown by reference 113.

Furthermore as the UE 1 and UICC 3 monitor the data line they are able to determine when the end of block has occurred and furthermore may organize their next transmission dependent on the state of the data line 53 signal. Thus in embodiments of the present invention in order that the UE 1 and UICC 3 do not transmit data at the same time on the same line the data line is considered to have been reserved by the current transmitting element (either the UE 1 or the UICC 3) whilst the data line is transmitting a block and for up to two clock periods after the end of block condition (i.e. if no new start bit is detected) is detected. In other embodiments of the invention the reservation period can be extended any number of clock periods after the data line 51 signal goes high.

Thus in embodiments of the invention a transmitter may reach the end of a transmitter block but may have further data to transmit. In this situation the transmitter may retain reservation of the data line 51 by transmitting the further data and initiating a start signal on the data line 51 after one clock period.

Furthermore in some embodiments of the present invention, during periods of inactivity the clock line 53 signal may be stopped in order to save power. For example in one embodiment of the present invention the UE 1 stops the clock line 53 signal four clock periods after the end of block condition (i.e. if no new start bit is detected) is detected. In other words two additional clock periods after the data line is reserved. In other embodiments of the invention the number of clock periods until the clock is stopped by the UE 1 is variable.

Thus in order to transmit data on the data line, the transmitter (either the UICC 3 or UE 1) must first reserve the data line. The data line 51 is reserved by pulling the data line 51 signal low at the falling edge of the clock signal or if the clock signal is stopped pulling the data line signal low.

Figure 5:
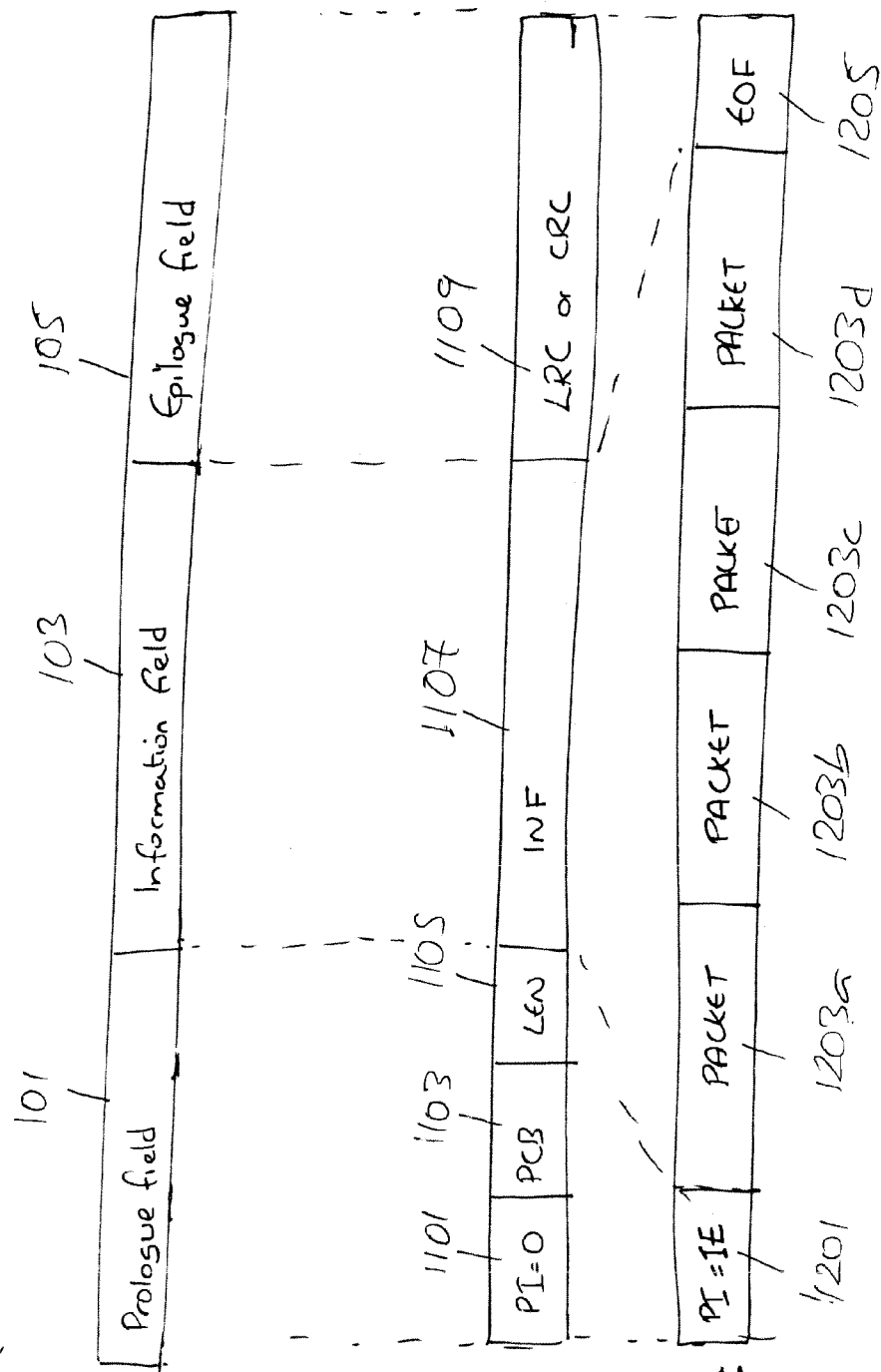
FIG. 5(a) shows a schematic view of a typical protocol data block as used in embodiments of the invention.
FIG. 5(b) shows a schematic view of a T=1 protocol block as used in the data structure in embodiments of the invention.
FIG. 5(c) shows a schematic view of an USB protocol transmitted as used in the data structure in embodiments of the invention.

With respect to FIG. 5(a), a schematic view of the format of the data transmitted on the interface 7 is shown. As described above data transmitted on the data line is transmitted in the form of blocks. Each block 110 may be divided up into three parts.

The first part 101, the header or prologue field provides the receiver of the data information required in order that the receiver of the data packet can receive and interpret the information in the remainder of the packet. The second part 103, the payload field or the body of the block, contains the data to be passed between the UICC 3 and the UE 1. The third part 105, the epilogue field or tail of the block provides the receiver with information that the block is ending.

With respect to FIGS. 5(b) and 5(c) examples of two data blocks which can be transmitted over the interface are shown to demonstrate the flexibility of the interface. FIG. 5(b) shows how T=1 protocol data may be carried over the interface embodied in the invention. The block prologue field 101 comprises a initial character (which contains 1 byte of data and a start bit) containing a protocol indicator 1101, a Protocol Control Byte (PCB) 1103 character, and a LEN 1105 character which defines the length of the information in the information field.

The protocol indicator (PI) 1101 defines the protocol used in the remainder of the block. In embodiments of the present invention the PI value used to represent a T=1 protocol packet is '00'. Furthermore in embodiments of the present invention the default protocol selected where the protocol indicator is not recognized as being a valid protocol indicator value is the T=1 protocol. The protocol identifier (PI) 1101 contains the necessary information for the receiver in order to extract the rest of the information from the data block. For example, where the protocol identifier is equal to 00, the receiver may be configured to extract the following PCB 1103, and LEN 1105 fields, decode them and then receive the T=1 application protocol data unit in the information field 1107 as defined in ETSI standard TS 102 221. Furthermore on receiving the PI indicating that the block is a T=1 block, the receiver can use the linear redundancy code (LRC) or cyclic redundancy code (CRC) 1009 in the epilogue field 105 in order to determine if the T=1 data has any errors.

FIG. 5(c) furthermore shows a first embodiment of how universal serial bus (USB) data can be transferred using the same interface. The USB data block also comprises a protocol indicator (PI) as the first character in the block, however the value of the protocol indicator differs from the T=1 protocol block. In an embodiment of the invention the protocol identifier value equal to '1E' in hexadecimal notation indicates that the remaining data in the block is coded as defined in the USB 2.0 specification. It will be understood that the value is an example only and any value in the range 1 to 255 or '01' to 'FF' can be used to identify the block as a different protocol.

As the conventional T=1 interface also uses control codes transmitted as the first character of a T=1 data block the range of values chosen to represent the number of protocols supported by the interface may preferably be chosen so that the range of the protocol identifier does not overlap with the range of the control codes. Furthermore the protocol indicator value is preferably chosen so that any error in reception does not result in an incorrect protocol being chosen. Error detection and correction can therefore be implemented by using redundancy of the PI bits. For example the PI value may be created from a 4 bit number followed by the 4 bit complement. Thus in the PI='1E' value disclosed above the first four bits are '0001'=1 in hex, and the second four bits are '1110'=E in hex.

On detecting the PI value indicating a USB block the receiver can then begin to decode the USB packets 1203a, 1203b, 1203c, 1203d. The fixed speeds (low, full, high speeds) of the conventional USB interface allow the use of time based transmission periods which can determine when a predetermined amount of information has been transmitted. In USB terminology therefore data is transferred in frames and microframes. The amount of data that can be transported in a frame or microframe depends on the physical speed of the interface. A frame on the USB interface is defined to be 1 ms in time which for the full speed conventional USB interface corresponds to a maximum of 1500 bytes transferred, as defined in the USB 2.0 specification. Furthermore conventional USB interfaces support different types of data transfers that have different priority on the interface. In the example, the control transfer has always access to the interface in each frame.

In order to create similar functionality on the synchronous interface embodied in the invention, where the actual physical transit speed may vary due to the speed of the data clock, a 'frame' of USB data is defined by USB data following the protocol indicator byte and followed by an end-of-frame marker.

In the embodiments of the present invention a maximum length of USB data of 1500 bytes is defined. If the USB data transmission is less than a frame (i.e. 1500 bytes), an end of frame marker 1205 is transmitted at the end of the data transmission. In other embodiments lengths other than 1500 bytes can be used to define a 'frame'.

The end of frame marker 1205 in embodiments of the invention is signaled by the transmission of a single character comprising a start bit and a characteristic value. For example the characteristic value is 'AA' in hex or '10101010' in binary. When the receiver receives this value the receiver of the data operates as if they had received an USB end of frame marker value as defined by the USB standards.

A further difference between USB data transmitted over the synchronous interface and the conventional USB interface is that in order to synchronise the transmission on the conventional USB interface as specified in the USB 2.0 specification, the host device transmits a start of frame token (SOF) at the start of the transmission. As the synchronous interface defined in the present document uses the clock signal to synchronise the data, the SOF is not needed to synchronise the data—however the SOF may be transmitted in embodiments of the invention in order to assist in the determination of the frame number for USB packet handling purposes.

Furthermore data in the USB protocol is NRZI (Non Return to Zero, Inverted)) coded scheme where voltage differences between two USB data lines signal whether a logical 1 or 0 is being transmitted. If a signal has a string of logical 0's or 1's synchronisation bits are inserted to prevent the receiver from being unsynchronised (i.e. inserting an extra logical 0 after a string of 6 logical 1's—also known as bit stuffing). However, for the same reason as described above in the present invention bit stuffing is not required. Therefore bandwidth can be saved in the present invention when transmitting USB data by stripping or filtering the stuffed bits prior to transmission or by not encoding the data with stuffed bits in the first place.

Also according to USB 2.0, USB data may contain the following packet fields.

SYNC: A fixed bit pattern which allows the sender and receiver to synchronise data;
PID: Packet identifier, indicates the type of packet;
ADDR: Address of either sender or receiver;
ENDP: Endpoint, which contains an additional address field;
Frame number: Which contains an 11 bit field incremented each frame;
Data: which contains between 0 to 1023 bytes of payload data;
CRC: a cyclic redundancy check bits
EOP: end of packet which contains bits not sent over the interface but is an electrical condition on the data wires which implies the package is terminated.

For the same reason as discussed above the clock signals provide synchronisation of data on the data line 53 and therefore there is no need to send SYNC packets and therefore the SYNC packets may be removed from any transmission data. However we may also use the PI field, which is sent prior to each packet, to synchronise the data.

The end of packet condition may be implemented over the synchronous interface as the lack of a start bit in a character. Therefore between any two USB packets there is at least one idle bit—which is interpreted by the interface as an end of block signal, and which makes it possible to distinguish the start of a new packet.

Figure 6:
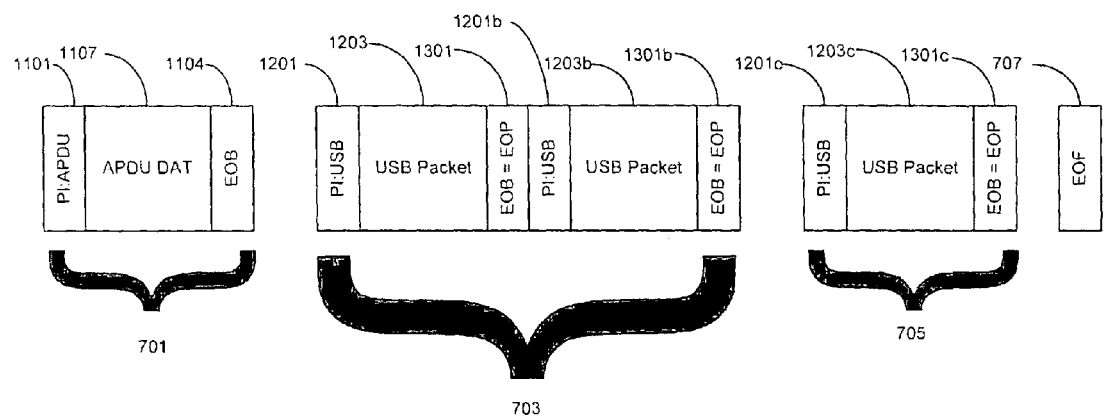
FIG. 6 shows a schematic view of different protocols used in embodiments of the invention.

In FIG. 6, an example of the interface transmitting both T=1 protocol data and USB data as implemented in the invention is shown. The data transmitted comprises a single T=1 block 701, which comprises as previously shown in FIG. 5(*b*), a PI 1101 indicating a APDU or T=1 protocol data unit, the APDU 1107, and the end of block data 1109. Following the T=1 block is shown two USB blocks 703 which immediately follow each other. Each of the USB blocks comprise a PI 1201 indicating a USB packet, a USB packet 1203 and the End of block (which also doubles as the end of packet condition) 1301. Following the USB blocks is a single USB block 705, which also comprises a PI 1201*c* indicating a USB packet, a USB packet 1203*c* and the End of block (which also doubles as the end of packet condition) 1301*c*. Finally at the end of the USB frame is the End of frame indicator as described above.

In order to operate this interface the device class specifications defined on top of the lower physical and data layers are used. These device class specifications may be implemented in such a way that they do not depend on the implementation of the physical layer—and as such can be easily implemented. However where classes determine USB frames some modification and care must be implemented as in conventional USB devices the term is specific to a time interval which is not necessarily followed in the synchronous interface. Therefore in other words the existing device classes can be modified to be used on top of the USB implementation as embodied in the invention described above.

In some embodiments of the invention the interface may be used as a conventional T=1 interface in order that the UE1 and UICC 3 may communicate with each other to determine if the improved T=1 protocol and USB protocol and any other data transfer protocol may be implemented between the UE 1 and UICC 3. An example of this is that in a conventional T=1 protocol packet the initial character transmitted is always=0.

The embodiments above have PI values allowing the same synchronous interface to carry both USB and T=1 protocol data packets. However it should be appreciated that the use of the PI and associated PI values enable the receiver with the subsequent ability to read a specific protocol type and attribute the protocol type to a PI value to be able to identify packets of that type being transmitted to it.

The receiver may therefore comprise a look up table (which may be implemented in hardware or software) or other processing arrangement to carry out the detection of the received PI value and the association with a type of protocol packet. The lookup table can be fixed or can be modified in order to extend the capability of the interface.

Thus in embodiments of the present invention a specific PI value or range of values can be assigned to a protocol or range of protocols, and thus more than one protocol may be transmitted over the synchronous interface described above. For example a PI value may be assigned to the multimedia card (MMC) protocol to enable the interface to transmit and receive packets encoded in the MMC protocol.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Furthermore although the interface has been described with respect to transmitting data between a UE and UICC it can be seen that the synchronous interface can be used in other environments. For example the embodiments of the invention may be implemented in any synchronous interface for example within a GPS/Galileo receiver module. For example where the receiver is required to identify the user of the module the module can communicate by the interface to a user identity module in a similar manner as described with respect to the UE and UICC. Furthermore the interface can be used to transport NMEA 0183 type data on the interface. This NMEA 0183 type data is the data type used for navigation and supported by GPS equipment In other embodiments of the invention the interface may be implemented in electrical equipment where data is transmitted to and from memory cards using the interface as described above. An example of which would be using a synchronous interface to enable MMC and USB data packets to be transmitted to and from a MMC or other flash memory device.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. An apparatus, comprising:
a processor; and
memory storing executable instructions that, with the processor, cause the apparatus to at least:
receive, via a data line to an identity module, a first data transmission, from the identity module, that is synchronous with a clock signal provided via a clock line between the apparatus and the identity module;
identify, from the first data transmission, a first protocol indicator that indicates a first protocol in which at least a portion of the first data transmission is being transmitted by the identity module;
decode the portion of the first data transmission based on the first protocol indicator;
receive, via the data line, a second data transmission, from the identity module, that is synchronous with the clock signal provided via the clock line;
identify, from the second data transmission, a second protocol indicator that indicates a second protocol in which at least a portion of the second data transmission is being transmitted by the identity module, wherein the second protocol is different from the first protocol; and
decode the portion of the second data transmission based on the second protocol indicator.

2. The apparatus as claimed in claim 1, wherein the first protocol is a universal serial bus (USB) protocol.

3. The apparatus as claimed in claim 1, wherein the first protocol is an asynchronous protocol.

4. The apparatus as claimed in claim 1, wherein the first protocol is a T=1 protocol.

5. The apparatus as claimed in claim 1, wherein the identity module comprises a central processing unit, read-only memory, random-access memory, and electronically erasable programmable read-only memory.

6. An apparatus as claimed in claim 1, wherein the clock signal is transmitted via the clock line from the apparatus and to the identity module.

7. An apparatus, comprising:
a processor; and
an interface in communication with the processor and an identity module, wherein the interface is configured to
provide a clock signal, via a clock line of the interface, between the processor and the identity module;
provide, via a data line of the interface between the processor and the identity module, a first data transmission that is synchronous with the clock signal, wherein the first data transmission comprises first data and a first protocol indicator that indicates a first protocol in which the first data is being provided; and
provide, via the data line, a second data transmission that is synchronous with the clock signal, wherein the second data transmission comprises second data and a second protocol indicator that indicates a second protocol in which the second data is being provided, wherein the second protocol is different from the first protocol.

8. The apparatus as claimed in claim 7, wherein the interface comprises a pull up resistor.

9. The apparatus as claimed in claim 7, wherein the first protocol indicator comprises a protocol identification byte.

10. The apparatus as claimed in claim 9, wherein a first four bits of the protocol identification byte store a value identifying the first protocol and a second four bits of the protocol identification byte store a complement of the value.

11. The apparatus as claimed in claim 7, wherein the first data transmission comprises at least one universal serial bus (USB) packet and at least one end-of-frame marker.

12. The apparatus as claimed in claim 11, wherein the USB packet is at least one of:
a Packet identifier (PID) packet;
an Address (ADDR) packet;
an end point (ENDP) packet;

a Frame number packet;
a USB data packet; and
a cyclic redundancy check (CRC) packet.

13. The apparatus as claimed in claim 7, wherein the first data transmission comprises a T=1 protocol block.

14. An apparatus, comprising:
a processor; and
memory storing executable instructions that, with the processor, cause the apparatus to at least:
  receive, via a data line to a universal integrated circuit card (UICC), a first data transmission that is synchronous with a clock signal provided via a clock line between the apparatus and the UICC;
  identify, from the first data transmission, a first protocol indicator that indicates a first protocol in which at least a portion of the first data transmission is being transmitted by the UICC;
  decode the portion of the first data transmission based on the first protocol indicator;
  receive, via the data line, a second data transmission, from the UICC, that is synchronous with the clock signal provided via the clock line;
  identify, from the second data transmission, a second protocol indicator that indicates a second protocol in which at least a portion of the second data transmission is being transmitted by the UICC, wherein the second protocol is different from the first protocol; and
  decode the portion of the second data transmission based on the second protocol indicator.

15. The apparatus as claimed in claim 14, wherein the first protocol indicator comprises a protocol identification byte.

16. The apparatus as claimed in claim 15, wherein a first four bits of the protocol identification byte store a value identifying the first protocol and a second four bits of the protocol identification byte store a complement of the value.

17. The apparatus as claimed in claim 14, wherein the first data transmission comprises at least one universal serial bus (USB) packet and at least one end-of-frame marker.

18. The apparatus as claimed in claim 17, wherein the at least one USB packet is at least one of:
a Packet identifier (PID) packet;
an Address (ADDR) packet;
an end point (ENDP) packet;
a Frame number packet;
a USB data packet; and
a cyclic redundancy check (CRC) packet.

19. The apparatus as claimed in claim 14, wherein the first data transmission comprises a T=1 protocol block.

20. A method comprising:
receiving, by a computing device via a data line to an identity module, a first data transmission, from the identity module, that is synchronous with a clock signal provided via a clock line between the computing device and the identity module;
identifying, from the first data transmission, a first protocol indicator that indicates a first protocol in which at least a portion of the first data transmission is being transmitted by the identity module;
decoding the portion of the first data transmission based on the first protocol indicator;
receiving, via the data line, a second data transmission, from the identity module, that is synchronous with the clock signal provided via the clock line;
identifying, from the second data transmission, a second protocol indicator that indicates a second protocol in which at least a portion of the second data transmission is being transmitted by the identity module, wherein the second protocol is different from the first protocol; and
decoding the portion of the second data transmission based on the second protocol indicator.

21. The method as claimed in claim 20, wherein the first protocol is a universal serial bus (USB) protocol.

22. The method as claimed in claim 20, wherein the first data transmission comprises an end of frame part following a predetermined size of universal serial bus (USB) protocol data.

23. The method as claimed in claim 22, wherein the predetermined size is 1500 bytes.

24. The method as claimed in claim 21, wherein USB protocol data of the first data transmission does not include SYNC packets.

25. The method as claimed in claim 21, further comprising:
filtering, by the identity module, USB protocol data of the first data transmission to remove one or more bit-stuffed logical zero signal values prior to the identity module transmitting the first data transmission to the computing device.

26. The method as claimed in claim 20, wherein the first protocol is a T=1 protocol.

27. The method of claim 20, wherein the first protocol is a T=1 protocol, and wherein the second protocol is a USB protocol.

28. A method, comprising:
receiving, by a computing device via a data line to a universal integrated circuit card (UICC), a first data transmission, from the UICC, that is synchronous with a clock signal provided via a clock line between the computing device and the UICC;
identifying, from the first data transmission, a first protocol indicator that indicates a first protocol in which at least a portion of the first data transmission is being transmitted by the UICC;
decoding the portion of the first data transmission based on the first protocol indicator;
receiving, by the computing device via the data line, a second data transmission, from the UICC, that is synchronous with the clock signal provided via the clock line;
identifying, from the second data transmission, a second protocol indicator that indicates a second protocol in which at least a portion of the second data transmission is being transmitted by the UICC, wherein the second protocol is different from the first protocol; and
decoding the portion of the second data transmission based on the second protocol indicator.

29. The method according to claim 28, wherein the first protocol is a universal serial bus (USB) protocol, and the second protocol is a T=1 protocol.

30. The method according to claim 28, wherein the first protocol is a protocol that synchronizes based on a fixed bit pattern.

31. The method according to claim 30, further comprising:
removing, by the UICC, the fixed bit pattern from first data transmission.

32. The method according to claim 28, wherein the first protocol is a protocol that is asynchronous.

33. The method according to claim 28, further comprising:
providing the at least one clock signal via the clock line between the computing device and the UICC.

34. The method according to claim 28, wherein the clock signal includes an internal clock signal of the computing device or an internal clock signal of the UICC, and the method further comprises:

transmitting, via the data line, signaling between the computing device and the UICC to synchronize the internal clock signal of the computing device and the internal clock signal of the UICC.

\* \* \* \* \*

UNITED STATES PATENT AND TRADEMARK OFFICE
CERTIFICATE OF CORRECTION

PATENT NO.        : 9,075,922 B2                                Page 1 of 1
APPLICATION NO.   : 11/848173
DATED             : July 7, 2015
INVENTOR(S)       : Jens-Ole Madsen et al.

It is certified that error appears in the above-identified patent and that said Letters Patent is hereby corrected as shown below:

On Page 2, Column 2, OTHER PUBLICATIONS, Line 1
        Please delete "Omnikeyreleases" and insert -- Omnikey releases --.

On Page 2, Column 2, OTHER PUBLICATIONS, Line 2
        Please delete "readerwith" and insert -- reader with --.

On Page 2, Column 2, OTHER PUBLICATIONS, Line 6
        Please delete "Unverisal" and insert -- Universal --.

Signed and Sealed this
Twenty-eighth Day of June, 2016

Michelle K. Lee
*Director of the United States Patent and Trademark Office*